(12) United States Patent
Kim et al.

(10) Patent No.: US 6,593,429 B2
(45) Date of Patent: Jul. 15, 2003

(54) POLYMER HAVING COMBINED LINEAR AND NONLINEAR STRUCTURE AND ITS PREPARING METHOD

(75) Inventors: Sam-Min Kim, Daejeon (KR); Jong-Geun Kim, Daejeon (KR); Jong-Hyun Park, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 10/201,233

(22) Filed: Jul. 22, 2002

(65) Prior Publication Data

US 2003/0096914 A1 May 22, 2003

(30) Foreign Application Priority Data

Nov. 16, 2001 (KR) ......................................... 2001-71280

(51) Int. Cl.$^7$ ............................. C08F 257/00; C08F 2/38
(52) U.S. Cl. ...................... 525/313; 525/242; 525/271; 526/82; 526/84; 526/336; 526/340
(58) Field of Search ................................. 525/271, 313, 525/242; 526/336, 340, 82, 84, 346

(56) References Cited

U.S. PATENT DOCUMENTS 3,661,873 A * 5/1972 Halasa et al. ................ 525/271
5,700,887 A    12/1997 Hahnfeld et al.
5,986,010 A * 11/1999 Clites et al. ................. 525/250

* cited by examiner

Primary Examiner—Fred Teskin
(74) Attorney, Agent, or Firm—Davidson, Davidson & Kappel, LLC

(57) ABSTRACT

A combined linear and nonlinear polymer (i.e., having a combined linear, branched and radial structure) P+PnD according to the present invention is represented by $(P+PnD)^{-+}Li$, where P is a polymer of a monovinyl aromatic monomer or a conjugated diene monomer; PD is a nonlinear polymer having a combined linear, branched and radial structure due to a multifunctional compound D bonded to the polymer P; n is an integer ranging from 2 to 10 and represents the average number of bonds between the monovinyl aromatic or conjugated diene polymer P and the multifunctional compound D; and $^+Li$ represents a metal ion as a partner of the active anion $(P+PnD)^-$. The combined linear and nonlinear polymer of the present invention, characterized by nonlinearity-related properties (i.e., low melting viscosity, low melting properties and high mechanical properties), can be used alone as a plastic material and freely introduced to different copolymer resins that are used as stiffening agents having a different property such as impact strength or thermal stability.

28 Claims, No Drawings

POLYMER HAVING COMBINED LINEAR AND NONLINEAR STRUCTURE AND ITS PREPARING METHOD

BACKGROUND OF THE INVENTION

1. Field of the Invention

The present invention relates to a polymer having a combined linear and nonlinear structure and method of preparation. More particularly, the present invention relates to a linear and nonlinear polymer (i.e., having a combined linear, branched, radial and star-like structure) that is prepared from a vinyl aromatic monomer or a conjugated diene monomer and a multifunctional compound by anionic polymerization, and its preparing method.

2. Related Prior Art

The nonlinear structure of a polymer generally affects crystallinity, melting point, mechanical properties, viscoelastic property, solution property or melting property of the polymer. Namely, nonlinear polymers are much superior in processability and workability to linear polymers having the same molecular weight owing to low melt and solution viscosity and also in mechanical properties to linear polymers having the same melt viscosity and solution viscosity.

A nonlinear polymer such as a branched polymer is prepared by different polymerization methods, including anionic polymerization and free radical polymerization. Among these polymerization methods, free radical polymerization hardly produces a polymer having a desired nonlinear structure due to difficulty in controlling the molecular weight and nonlinearity (e.g., branch density) of the polymer. Thus nonlinear polymers are usually prepared by anionic polymerization that is easy to control.

An example of using anionic polymerization in the preparation of a nonlinear polymer is disclosed in U.S. Pat. No. 5,700,887, which describes a method of preparing a nonlinear polystyrene polymer that includes contacting styrene with sodium naphthalene used as a difunctional anionic initiator for anionic initiation, and adding a mixture of difunctional 1,4-bis(chloromethyl)benzene and trifunctional 1,3,5-tris(chloromethyl)benzene as a multifunctional compound.

In this preparation method, a polar solvent is used because the difunctional anionic initiator has a low solubility in non-polar solvents. But the use of a polar solvent causes difficulty in controlling the fine structure of the polymer prepared from the conjugated diene monomer and is actually limited in the range of applications. This method also requires using two different multifunctional compounds in combination so as to produce a polymer having a combined nonlinear structure, including star-like and radial structures. The use of multifunctional halide compounds in this preparation method results in production of lithium chloride as a byproduct, which has an adverse effect on the thermal stability or color stability of the polymer product.

Besides, the chain reaction such as anionic polymerization, a step reaction can also be applied to the preparation of nonlinear polymers, in which case monomers having at least two functional groups are used.

Unlike anionic polymerization, the step reaction requires an accurate control of equivalents of reactants so as to produce polymers of a desired structure and is disadvantageously susceptible to runaway reaction and gelation.

SUMMARY OF THE INVENTION

It is therefore an object of the present invention to provide a polymer prepared by anionic polymerization that (a) overcomes the shortcoming of free radical polymerization that has difficulty in controlling reactivity and hence the linearity (e.g., branch density, etc.) or molecular weight of the product, (b) avoids a step reaction susceptible to runaway reaction and gelation, and (c) involves the use of a non-polar solvent as a polymerization solvent for wide applications, without producing any salts (e.g., lithium chloride) that may adversely affect the properties of the final product such as thermal stability and resistance to discoloration.

It is another object of the present invention to provide a method for preparing a multi-component polymer having a combined linear and nonlinear structure using an anionic initiator, a vinyl aromatic monomer or a conjugated diene monomer and a multifunctional compound.

More specifically, the object of the present invention is providing a combined linear and nonlinear polymer (i.e., having a combined linear, branched, radial and star-like structure) from a vinyl aromatic monomer or a conjugated diene monomer and a multifunctional compound by anionic polymerization, and a method for preparing the combined linear and nonlinear polymer (i.e., having a combined linear, branched, radial and star-like structure) using anionic polymerization that adequately controls the reactivity of the multifunctional compound, otherwise hard to control the reactivity in the conventional anionic polymerization method, and thereby overcomes such a problem with free radical polymerization, step polymerization, or the conventional anionic polymerization as difficulty in control of reactivity and instability of properties.

To achieve the objects of the present invention, there is provided a vinyl aromatic or conjugated diene polymer having a combined linear and nonlinear structure, the polymer being represented by the following formula 1:

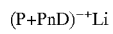　　　　　　　　　　　　　　　　　　　Formula 1 wherein P is a polymer of a monovinyl aromatic monomer or a conjugated diene monomer; PD is a nonlinear polymer having a combined linear, branched, radial and star-like structure due to a multifunctional compound D bonded to the polymer P; n is an integer ranging from 2 to 10 and represents the average number of bonds between the monovinyl aromatic or conjugated diene polymer P and the multifunctional compound D; $(P+PnD)^-$ represents a vinyl aromatic or conjugated diene polymer having a combined linear and nonlinear structure; and $^+Li$ represents a counter metal ion of the active anion $(P+PnD)^-$.

The combined linear and nonlinear polymer represented by the formula 1 is prepared by a method using an anionic initiator, a vinyl aromatic monomer or a conjugated diene monomer and a multifunctional compound, the method including: (1) adding the monovinyl aromatic monomer or the conjugated diene monomer and the anionic initiator, (2) adding the multifunctional compound and the conjugated diene monomer or the vinyl aromatic monomer; and (3) adding an active hydrogen compound.

Now, the present invention will be described in further detail as follows.

The combined linear and nonlinear polymer (i.e., having a combined linear, branched, radial and star-like structure) according to the present invention is represented by $(P+PnD)^{-+}Li$, where P is a polymer of a monovinyl aromatic monomer or a conjugated diene monomer; PD is a nonlinear polymer having a combined linear, branched, radial and star-like structure due to a multifunctional compound D bonded to the polymer P; n is an integer ranging from 2 to 10 and represents the average number of bonds between the monovinyl aromatic or conjugated diene polymer P and the multifunctional compound D; and $^+Li$ represents a metal ion as a partner of the active anion $(P+PnD)^-$.

In the preparation of the polymer of the present invention, the vinyl aromatic monomer contains 8 to 12 carbons and specifically includes styrene, α-methylstyrene, o-vinylstyrene, p-vinylstyrene, p-t-butylstyrene, 4-ethylstyrene, 3-ethylstyrene, 4-t-butylstyrene, 2,4-dimethylstyrene, or mixtures of them. Among these monomers, styrene is most preferred.

The conjugated diene monomer contains 4 to 6 carbons and specifically includes 1,3-butadiene, 2-methyl-1,3-butadiene (what is called "isoprene"), 2-ethyl-1,3-butadiene, 2,3-dimethyl-1,3-butadiene, or mixtures of them. Among these monomers, 1,3-butadiene and 2-methyl-1,3-butadiene are preferable.

The anionic initiator useful for anionic polymerization of the vinyl aromatic monomer or the conjugated diene monomer includes an organic lithium initiator represented by RM, where R is $C_4$ to $C_8$ alkyl or cycloalkyl and M is an alkali metal. Namely, the organic lithium initiator may be any one that is normally used for anionic polymerization, and n-butyl lithium and sec-butyl lithium are preferable.

The multifunctional compound is introduced after initiating the reaction using the anionic initiator. The multifunctional compound as used herein is a multifunctional vinyl aromatic compound, which is not used alone but in combination with the conjugated diene monomer. Specific examples of the multifunctional vinyl aromatic compound may include divinylbenzene, 1,2,4-trivinylbenzene, 1,3-divinylnaphthalene, 1,3,5-trivinylnaphthalene, 2,4-divinylbiphenylparadiisopropenylbenzene, or mixtures of them. Among these compounds, divinylbenzene is most preferred. The conjugated diene monomer used in combination with the multifunctional vinyl aromatic compound is preferably 1,3-butadiene or 2-methyl-1,3-butadiene.

The weight average molecular weight of the polymer P of the monovinyl aromatic monomer or the conjugated diene monomer is approximately at least 500 to 1,000,000, more preferably 10,000 to 500,000, most preferably 10,000 to 200,000.

The weight average molecular weight of the mixed polymer P+PND of the linear polymer P not participating in bonding of the multifunctional vinyl aromatic compound and the nonlinear polymer PnD participating in bonding of the multifunctional vinyl aromatic compound is approximately at least 1,000 to 1,000,000, more preferably 10,000 to 600,000, most preferably 20,000 to 300,000. The molecular weight distribution of the mixed polymer is approximately at least 1.08 to 4, more preferably 1.1 to 2.0, most preferably 1.1 to 1.5.

The weight average molecular weight of the polymer PnD having a nonlinear (i.e., combined linear, branched, radial and star-like) structure due to the multifunctional compound is approximately at least 2,000 to 2,000,000, more preferably 20,000 to 1,000,000, most preferably 30,000 to 500,000. The molecular weight distribution of the nonlinear polymer is approximately at least 1.05 to 2, more preferably 1.05 to 1.5, most preferably 1.05 to 1.3.

The content of the polymer PnD having a nonlinear (i.e., combined linear, branched, radial and star-like) structure due to the multifunctional compound is, based on the total weight of the mixed polymer P+PND, approximately at least 0 to 90 wt. %, more preferably 10 to 70 wt. %, most preferably 20 to 60 wt. %.

The average number n of branches of the polymer PnD having a nonlinear (i.e., combined linear, branched and radial) structure is 2 to 10, more preferably 2 to 6, most preferably 2 to 4.

When n is 2 to 4, the content of the linear polymer $P_2D$ containing two polymers of the vinyl aromatic monomer or the conjugated diene monomer bonded to the multifunctional vinyl aromatic compound is, based on the total weight of the mixed nonlinear polymer P+PnD, approximately at least 5 to 60 wt. %, more preferably 10 to 50 wt. %, most preferably 15 to 40 wt. %. When n is 3 or more, that is, the polymer has an at least branched structure, the content of the polymer $P_{3-4}D$ is approximately at least 1 to 50 wt. %, more preferably 3 to 40 wt. %, most preferably 5 to 30 wt. %.

Now, a detailed description will be given as to a method for preparing a combined linear and nonlinear polymer (i.e., having a combined linear, branched, radial and star-like structure) using an anionic initiator, a vinyl aromatic monomer or a conjugated diene monomer and a multifunctional compound in accordance with the present invention.

The copolymer of the present invention is prepared, if not specifically limited to, in the following three steps:
(a) adding the monovinyl aromatic monomer or conjugated diene monomer and the initiator;
(b) adding the multifunctional compound and the conjugated diene monomer or vinyl aromatic monomer; and
(c) adding an active hydrogen compound.

In the step (a), the polymer of the monovinyl aromatic monomer or the conjugated diene monomer is prepared. The anionic initiator may be added either before or after adding the monovinyl aromatic monomer or the conjugated diene monomer, and is preferably added after addition of the monovinyl aromatic monomer or the conjugated diene monomer.

In the step (b), the polymer of the monovinyl aromatic monomer or the conjugated diene monomer obtained in the step (a) is converted to a mixed polymer of the linear polymer not participating in bonding of the multifunctional compound and the nonlinear polymer (i.e., having a combined linear, branched, radial and star-like structure) participating in bonding of the multifunctional compound. The multifunctional compound and the conjugated diene monomer or the vinyl aromatic monomer are mixed with the polymer of the step (a) in advance prior to being used, or added in a simultaneous or sequential manner.

The phm ratio of the multifunctional compound to the polymerization initiator is 0.05 to 10, more preferably 0.2 to 3, most preferably 0.3 to 1.5.

The conjugated diene monomer or the vinyl aromatic monomer used in combination with the multifunctional compound in a simultaneous or sequential manner is used in an amount of 0.1 to 30 phm, more preferably 0.2 to 15 phm, most preferably 0.5 to 10 phm.

The multifunctional compound added in the step (b) is preferably diluted with the conjugated diene monomer or the vinyl aromatic monomer prior to being used. Namely, it is desirable to use the mixture of the multifunctional compound and the conjugated diene monomer or the vinyl aromatic compound. The reason of this is controlling the reactivity of the multifunctional compound. First, the use of the multifunctional compound in combination with the conjugated diene monomer or the vinyl aromatic monomer has an effect of diluting the multifunctional compound and thereby reducing the coupling reaction between the multifunctional compounds.

Second, the simultaneous addition of the multifunctional compound and the conjugated diene monomer suppresses the indiscriminate coupling reaction between the multifunctional compounds due to the difference in reaction rate. Namely, in the anionic polymerization using an organic metal initiator in a non-polar solvent, the rate of adding the conjugated diene monomer to the end of the polymer containing the living vinyl aromatic monomer or the living conjugated diene monomer is faster than that of adding the vinyl aromatic monomer. Thus when the multifunctional compound as a sort of the vinyl aromatic monomer and the conjugated diene monomer are simultaneously introduced to the living end of the polymer, the conjugated diene monomer is added to the living end of the polymer and becomes the living end of the polymer of the conjugated diene monomer.

As the conjugated diene monomer is added to the living polymer and its content in the polymerization solution decreases, the rate of adding the multifunctional compound to the living polymer increases. But there is still a high probability that the end is present as the living end of the polymer of the conjugated diene monomer, as a consequence of which the production of the polymer having a high molecular weight caused by the indiscriminate coupling reaction between the multifunctional compound is greatly reduced.

As the concentration of the conjugated diene monomer decreases, the coupling reaction between the multifunctional compounds occurs just a little but results in a little yield of the reaction product, because the multifunctional compound is nearly used up.

The use of the vinyl aromatic monomer in combination with the multifunctional compound is substantially the same in effect as the use of the conjugated diene monomer but insignificantly has the second one of the above-stated effects. However, such a use of the vinyl aromatic monomer in combination with the multifunctional compound cannot be excluded in the present invention.

In the step (c), the carbon-lithium bond of the active polymer phase of the combined linear and nonlinear polymer P+PnD obtained in the step (b) is treated with the active hydrogen compound and converted to a carbon-hydrogen bond to terminate the reaction. The reaction is performed in the inert atmosphere destitute of oxygen or moisture. Prior to termination of the reaction, the end of the individual polymer chain is activated. Impurities such as water or alcohol reduce the content of the active polymer in the reaction mixture.

The inactive hydrocarbon solvent for polymerization reaction may be any solvent available for anionic polymerization. Specific examples of the inactive hydrocarbon solvent include pentane, hexane, octane, cyclohexane, or mixtures of them. Among these solvents, cyclohexane is preferred.

A polar organic compound is added to the hydrocarbon solvent so as to improve the effect of the organic lithium initiator. Specific examples of the polar organic compound include ethers, thio ethers, tertiary amines, or mixtures of them. Among these polar organic compounds, tetrahydrofuran is most preferred.

The reaction temperature is in the range of −10 to 150° C., preferably 10 to 110° C. The reaction is performed with such a pressure as to maintain the reaction mixture in the liquid state.

After the completion of the reaction, the polymer product is treated with an active hydrogen compound such as water, alcohol, phenol or dicarboxylic acid to convert the carbon-lithium bond of the active polymer phase to a carbon-hydrogen bond and to isolate the polymer. The most preferred polymerization terminator is water or carbon dioxide.

The molecular weight or the nonlinearity of the polymer thus obtained are determined through gel permeation chromatography (GPC).

For GPC analysis, Waters-2690 body (including pump, injector and column box), Waters 410 Differential refractometer as a detector and HR5E-HR4-HR4-HR2 (Waters) as a column are connected in series. Using tetrahydrofuran as a solvent, the individual samples are analyzed at 41° C. with a flux of 0.3 ml/min for 60 minutes.

DETAILED DESCRIPTION OF THE INVENTION

Hereinafter, the present invention will be described in detail by way of the following examples, which are not intended to limit the scope of the present invention.

For explanation of the present invention, there were used styrene as a monovinyl aromatic monomer, divinylbenzene as a multifunctional vinyl aromatic compound, butadiene as a monomer used in combination with divinylbenzene, and tetrahydrofuran as a polar organic compound used to enhance the reactivity of the initiator.

Now, a description will be given to a method for preparing a combined linear and nonlinear polymer (i.e., having a combined linear, branched, radial and star-like structure) by way of the examples. Cyclohexane, styrene, divinylbenzene used as a multifunctional compound and 1,3-butadiene additionally introduced to the multifunctional compound were purified through an activated alumina column for the sake of satisfactory progress of anionic polymerization. N-butyl lithium and tetrahydrofuran were used as an anionic initiator and an initiator activator, respectively.

Polymerization was performed in the nitrogen atmosphere with a 5L-stainless steel reactor equipped with a jacket and capable of stirring. During the polymerization reaction, anhydrous reactants were continuously stirred. Separately, cyclohexane with which tetrahydrofuran was mixed was preheated to 60° C. and added to the reactor prior to the addition of the monomer to the reactor. N-butyl lithium used as an initiator was 2 M in cyclohexane and methanol was used to terminate the reaction.

For the preparation of polystyrene, a styrene monomer and an initiator were sequentially added to the reactor for conversion of the styrene monomer to a polymer, polystyrene. And then, polystyrene was converted to a combined linear and nonlinear polymer (i.e., having a combined linear, branched, radial and star-like structure) after addition of divinylbenzene which was diluted in 1,3-butadiene. The process of the reaction and the added amounts of the individual components are presented in Table 1. The results are shown in Table 2.

TABLE 1

| Component (phm) | Example 1 | Example 2 | Example 3 |
|---|---|---|---|
| Step 1 | | | |
| Cyclohexane | 1034 | 1034 | 1034 |
| Tetrahydrofuran | 0.217 | 0.215 | 0.023 |
| N-butyl lithium initiator | 0.406 | 0.429 | 0.041 |
| Styrene | 93.1 | 93.1 | 93.1 |

TABLE 1-continued

| Component (phm) | Example 1 | Example 2 | Example 3 |
|---|---|---|---|
| Step 2 | | | |
| Divinylbenzene | 0.505 | 0.281 | 0.020 |
| 1,3-butadiene | 6.9 | 6.9 | 1.0 |
| Step 3 | | | |
| Methanol | 0.20 | 0.21 | 0.020 |

TABLE 2

| | | Example 1 | Example 2 | Example 3 |
|---|---|---|---|---|
| Ratio of divinylbenzene to n-butyl lithium (phm/phm) | | 1.244 | 0.655 | 0.495 |
| Mw[(1)] of polystyrene (P) | | 15,300 | 14,400 | 149,000 |
| P + PnD | Mw[(1)] | 31,200 | 24,000 | 214,000 |
| | MWD[(2)] | 1.31 | 1.19 | 1.18 |
| PnD | Mw[(1)] | 45,100 | 40,400 | 379,000 |
| | MWD[(2)] | 1.25 | 1.19 | 1.18 |
| | Content (wt. %) | 49.4 | 27.9 | 23.6 |
| N | | 3.0 | 2.8 | 2.5 |
| wt. % of $P_2D$ | | 30.5 | 20.7 | 17.6 |
| wt. % of $P_{3-4}D$ | | 18.9 | 7.2 | 6.0 |

[(1)]: Weight average molecular weight
[(2)]: Molecular weight distribution

As seen from Table 2, the content of the nonlinear structure resulting from divinylbenzene in the combined linear and nonlinear polystyrene polymers P+PnD (i.e., having a combined linear, branched, radial and star-like structure) as prepared in Examples 1, 2 and 3 were 49.4 wt. %, 27.9 wt. % and 23.6 wt. %, respectively.

In the combined linear and nonlinear polymers P+PND of Examples 1, 2 and 3, the content of the linear polymer $P_2D$ was 30.5 wt. %, 20.7 wt. % and 17.6 wt. %, respectively, and that of the branched polymer $P_{3-4}D$ including radial and star-like polymer was 18.9 wt. %, 7.2 wt. % and 6.0 wt. %, respectively. The average number n of bonds to divinylbenzene in the polystyrene polymers was 3.0, 2.8 and 2.5, respectively.

The combined linear and nonlinear polystyrene polymers (i.e., having a combined linear, branched, radial and star-like structure) according to Examples 1, 2 and 3 were prepared in three steps, where polystyrene was produced in the step (a) and converted to the combined linear and nonlinear polymer by divinylbenzene in the step (b). Divinylbenzene added in the step (b) was diluted with the conjugated diene monomer, i.e., 1,3-butadiene before being used. Namely, a mixture of divinylbenzene and 1,3-butadiene was used.

The reason of this is controlling the reactivity of divinylbenzene. First, the use of divinylbenzene in combination with 1,3-butadiene had an effect of diluting divinylbenzene and thereby reducing the coupling reaction between divinylbenzene molecules. Second, the simultaneous addition of divinylbenzene and 1,3-butadiene suppressed the indiscriminate coupling reaction between divinylbenzene molecules due to the difference in reaction rate. Namely, in the anionic polymerization using an organic metal initiator in a non-polar solvent, the rate of adding the conjugated diene monomer to the end of the polymer containing the living vinyl aromatic monomer or the living conjugated diene monomer is faster than that of adding the vinyl aromatic monomer. Thus when divinylbenzene and 1,3-butadiene were simultaneously introduced to the block end of polystyrene, 1,3-butadiene was added to the end of polystyrene and becomes the leaving end of polystyrene. As the butadiene monomer was added to the polymer and its content in the polymerization solution decreased, the rate of adding divinylbenzene to the polymer increased. But there was still a high probability that the end was present as butadiene lithium, as a consequence of which the production of the polymer having a high molecular weight caused by the indiscriminate coupling reaction between divinylbenzene molecules was greatly reduced. With a decrease in the concentration of butadiene, the coupling reaction between divinylbenzene molecules occurred just a little but resulted in a little yield of the reaction product, because divinylbenzene was nearly used up.

As described above, the present invention provides the preparation of a combined linear and nonlinear polymer with the composition of nonlinearity (i.e., having a combined linear, branched, radial and star-like structure) controllable using a method for controlling the reactivity of the multifunctional compound, which is otherwise impossible by the conventional anionic polymerization method. In the preparation of a nonlinear structure, the present invention not using a halide compound enhances the processibility and properties of the final polymer without deteriorating thermal stability or color stability. Moreover, the present invention prepares a combined linear and nonlinear polymer using a non-polar solvent instead of a polar solvent and therefore readily controls the fine structure of the polymer prepared from a conjugated diene monomer. In addition, the combined linear and nonlinear polymer of the present invention, which is characterized by nonlinearity-related properties (i.e., low melting viscosity, low melting properties and high mechanical properties), can be used alone as a plastic material and freely introduced to different copolymer resins that are used as a reinforcing agent having a different property such as impact strength or thermal stability.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A polymer having a combined linear and nonlinear structure as represented by the following formula:

P+PnD wherein P is a polymer of a monovinyl aromatic monomer; and
   PnD is a nonlinear polymer having a combined linear, branched and radial structure due to a multifunctional compound D bonded to the polymer P, wherein n is an integer ranging from 2 to 10 and represents the average number of bonds between polymer P and the multifunctional. compound D, wherein the content of the nonlinear polymer PnD having a combined linear, branched and radial structure due to the multifunctional compound D is 10 to 70 wt. % based on the total weight of the mixed polymer P+PnD.

2. The polymer as claimed in claim 1, wherein the polymer P of the monovinyl aromatic monomer has a weight average molecular weight of 500 to 1,000,000.

3. The polymer as claimed in claim 1, wherein the mixed polymer P+PnD has a weight average molecular weight of 1,000 to 1,000,000 and a molecular weight distribution of 1.08 to 4.

4. The polymer as claimed in claim 1, wherein the nonlinear polymer PnD having a combined linear, branched and radial structure due to the multifunctional compound D has a weight average molecular weight of 2,000 to 2,000,000 and a molecular weight distribution of 1.05 to 2.

5. The polymer as claimed in claim 1, wherein, when the n representing the average number of branches of the nonlinear polymer PnD having a combined linear, branched and radial structure due to the multifunctional compound is 2 to 4, the content of a linear polymer $P_2D$ containing two of the vinyl aromatic polymers bonded to the multifunctional compound is 5 to 60 wt. % based on the total weight of the mixed polymer P+PND.

6. The polymer as claimed in claim 1, wherein when the n representing the average number of branches of the nonlinear polymer PnD having a combined linear, branched and radial structure due to the multifunctional compound is 3 or more, the content of a polymer is 1 to 50 wt. % based on the total weight of the mixed polymer P+PnD.

7. The polymer as claimed in claim 1, wherein the monovinyl aromatic monomer contains 8 to 12 carbons.

8. The polymer as claimed in claim 1, wherein the multifunctional compound is selected from the group consisting of divinylbenzene, 1,2,4-trivinylbenzene, 1,3-divinylnaphthalene, 1,3,5-trivinylnaphthalene, 2,4-divinylbiphenylparadiisopropenylbenzene, and mixtures thereof.

9. A method for preparing a combined linear and nonlinear polymer represented by the following formula:

P+PnD wherein P is a polymer of a monovinyl aromatic monomer;

PnD is a nonlinear polymer having a combined linear, branched and radial structure due to a multifunctional compound D bonded to the polymer P, wherein n is an integer ranging from 2 to 10 and represents the average number of bonds between the polymer P and the multifunctional compound D, wherein the content of the nonlinear polymer PnD having a combined linear, branched and radial structure due to the multifunctional compound D is 10 to 70 wt. % based on the total weight of the mixed polymer P+PnD; and P+PnD represents a polymer having a combined linear and nonlinear structure, the method comprising:
  (a) adding the monovinyl aromatic monomer, an organo lithium initiator and polymerization solvent to produce an anionic polymer;
  (b) adding the multifunctional compound and conjugated diene monomer to the anionic polymer to produce an active polymer phase of the combined linear and nonlinear polymer, wherein the content of the combined linear and nonlinear polymer is 10 to 70 wt. % based on the total weight of the mixed polymer P+PnD; and
  (c) adding an active hydrogen compound to the active polymer phase to terminate the reaction.

10. The method as claimed in claim 9, wherein the monovinyl aromatic monomer contains 8 to 12 carbons.

11. The method as claimed in claim 9, wherein the monovinyl aromatic monomer is styrene.

12. The method as claimed in claim 10, wherein the monovinyl aromatic monomer is styrene.

13. The method as claimed in claim 9, wherein the conjugated diene monomer contains 4 to 6 carbons.

14. The method as claimed in claim 9, wherein the conjugated diene monomer is butadiene or isoprene.

15. The method as claimed in claim 13, wherein the conjugated diene monomer is butadiene or isoprene.

16. The method as claimed in claim 9, wherein the multifunctional compound is selected from the group consisting of divinylbenzene, 1,2,4-trivinylbenzene, 1,3-divinylnaphthalene, 1,3,5-trivinylnaphthalene, 2,4-divinylbiphenylparadiisopropenylbenzene, and mixtures thereof.

17. The method as claimed in claim 9, wherein the multifunctional compound is divinylbenzene.

18. The method as claimed in claim 16, wherein the multifunctional compound is divinylbenzene.

19. The method as claimed in claim 9, wherein the polymerization solvent is selected from the group consisting of pentane, hexane, octane and cyclohexane.

20. The method as claimed in claim 9, wherein the polymerization solvent is cyclohexane.

21. The method as claimed in claim 19, wherein the polymerization solvent is cyclohexane.

22. The method as claimed in claim 9, wherein a polar organic solvent further used in combination with the organo lithium initiator is tetrahydrofuran.

23. The method as claimed in claim 9, wherein in the step (b), the multifunctional compound and the conjugated diene monomer are added in combination or separately in a simultaneous or sequential manner.

24. The method as claimed in claim 9, wherein in the step (b) of adding the multifunctional compound and the conjugated diene monomer, the conjugated diene monomer is butadiene or isoprene.

25. The method as claimed in claim 23, wherein in the step (b) of adding the multifunctional compound and the conjugated diene monomer, the conjugated diene monomer is butadiene or isoprene.

26. The method as claimed in claim 9, wherein the multifunctional compound D is added at a phm ratio of 0.05 to 10 with respect to the organo lithium initiator.

27. The method as claimed in claim 9, wherein the conjugated diene monomer of step (b) is added in an amount of 0.1 to 30 phm.

28. The method as claimed in claim 9, wherein the active hydrogen compound is selected from the group consisting of water, alcohol, phenol, and dicarboxylic acid.

* * * * *